United States Patent
Stack et al.

(10) Patent No.: US 8,180,982 B2
(45) Date of Patent: May 15, 2012

(54) ARCHIVAL AND RETRIEVAL OF DATA USING LINKED PAGES AND VALUE COMPRESSION

(75) Inventors: Lance C. Stack, Aurora, CO (US); Gerald E. Kaas, Castle Rock, CO (US); Kevin E. Payne, Aurora, CO (US)

(73) Assignee: Raytheon Company, Waltham, MA (US)

( * ) Notice: Subject to any disclaimer, the term of this patent is extended or adjusted under 35 U.S.C. 154(b) by 858 days.

(21) Appl. No.: 11/924,970

(22) Filed: Oct. 26, 2007

(65) Prior Publication Data

US 2009/0037675 A1 Feb. 5, 2009

Related U.S. Application Data

(60) Provisional application No. 60/953,344, filed on Aug. 1, 2007.

(51) Int. Cl.
*G06F 12/00* (2006.01)

(52) U.S. Cl. ............ 711/161; 455/414.2; 711/E12.001; 707/705; 707/726

(58) Field of Classification Search .................. 711/161; 703/8; 455/414.2; 370/519; 707/705, 726
See application file for complete search history.

(56) References Cited

U.S. PATENT DOCUMENTS

| | | | | |
|---|---|---|---|---|
| 5,287,499 | A * | 2/1994 | Nemes ................................. 1/1 |
| 5,365,451 | A * | 11/1994 | Wang et al. ..................... 701/213 |
| 6,256,602 | B1 * | 7/2001 | Ellis et al. ........................ 703/8 |
| 7,696,869 | B2 * | 4/2010 | Brown ..................... 340/539.22 |
| 2001/0021901 | A1 * | 9/2001 | Ellis et al. ........................ 703/8 |
| 2002/0169566 | A1 * | 11/2002 | Smith et al. ..................... 702/22 |
| 2005/0071379 | A1 * | 3/2005 | Kekre et al. ................... 707/200 |
| 2006/0133428 | A1 * | 6/2006 | Guthrie et al. ................ 370/519 |
| 2008/0254777 | A1 * | 10/2008 | Arneson et al. ............ 455/414.2 |

* cited by examiner

*Primary Examiner* — Mardochee Chery
(74) *Attorney, Agent, or Firm* — Schwegman, Lundberg & Woessner, P.A.

(57) ABSTRACT

A method for archiving data comprises storing static information in a header compartment, the static information including one or more pointers. The method further comprises writing updated time stamps to a page compartment for one or more measurand updates, and writing, to a page compartment, a pointer to a data compartment entry. The method further comprises writing measurand data to a data compartment entry.

18 Claims, 4 Drawing Sheets

ARCHIVAL AND RETRIEVAL OF DATA USING LINKED PAGES AND VALUE COMPRESSION

RELATED APPLICATIONS

This application claims the benefit under 35 U.S.C. §119(e) of U.S. Provisional Patent Application Ser. No. 60/953,344 filed on Aug. 1, 2007.

TECHNICAL FIELD

This disclosure relates in general to computer systems, and more particularly to archiving and retrieving data.

BACKGROUND

Data taken from remote sensors, such as those in spacecraft, is typically received and processed at computer systems located elsewhere. Data such as telemetry data, temperature measurements, or electrical circuit measurements (voltage or current) can be reported as a series of time-ordered points, which is then archived as the data arrives, in time order. Thousands of unique data identifiers may be collected and processed per second, but an operator or analyst may only be interested in a small subset of the archived data. Some existing systems store the data received sequentially on disk, with records ordered by increasing time and without separating them by data type. If the data cannot be stored in a fixed-size record, it is often split into two pieces: an index containing fixed-size data, and a pointer to variable length data.

Retrieving data stored in this format traditionally involves scanning through every record and discarding those that do not meet the requested criteria. This process can waste CPU cycles, disk I/O bandwidth, and time.

SUMMARY OF EXAMPLE EMBODIMENTS

In accordance with one embodiment of the present disclosure, a system for archiving data comprises a header compartment comprising one or more pieces of static information. The system further comprises a data compartment comprising measurand data. The system further comprises a page compartment comprising one or more timestamps and one or more pointers to a data compartment entry.

In accordance with another embodiment of the present disclosure a method for archiving data comprises storing static information in a header compartment, the static information including one or more pointers. The method further comprises writing updated time stamps to a page compartment for one or more measurand updates, and writing, to a page compartment, a pointer to a data compartment entry. The method further comprises writing measurand data to a data compartment entry.

Embodiments of the disclosure may provide numerous technical advantages. Some, none, or all embodiments may benefit from the below described advantages. According to one embodiment, the ability to archive large amounts of telemetry and sensor data in real-time is presented. Other advantages include the ability to return requested data quickly and efficiently.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1A:
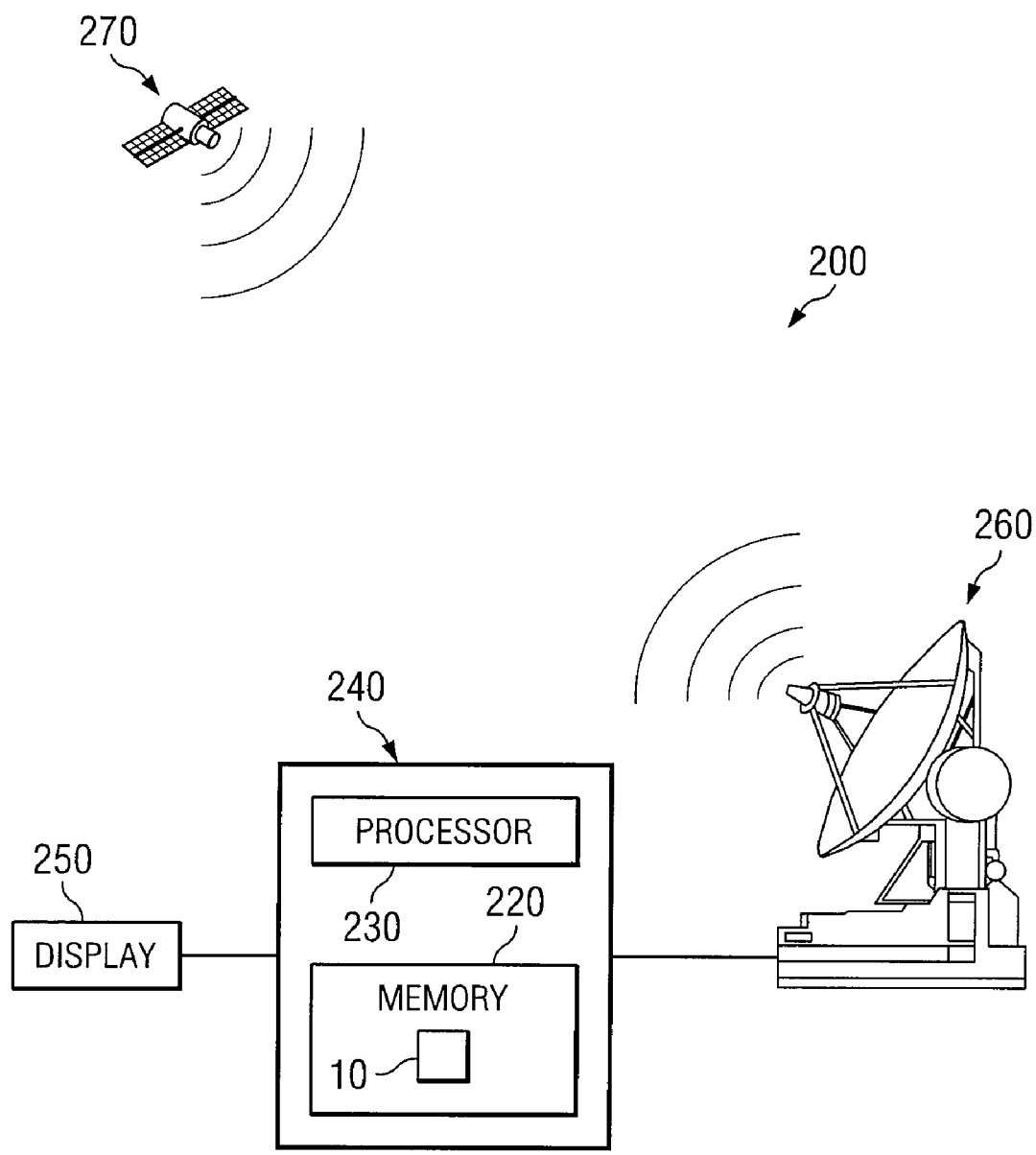
FIG. 1A illustrates one embodiment of a computer system for archiving telemetry or sensor data.
Figure 1B:
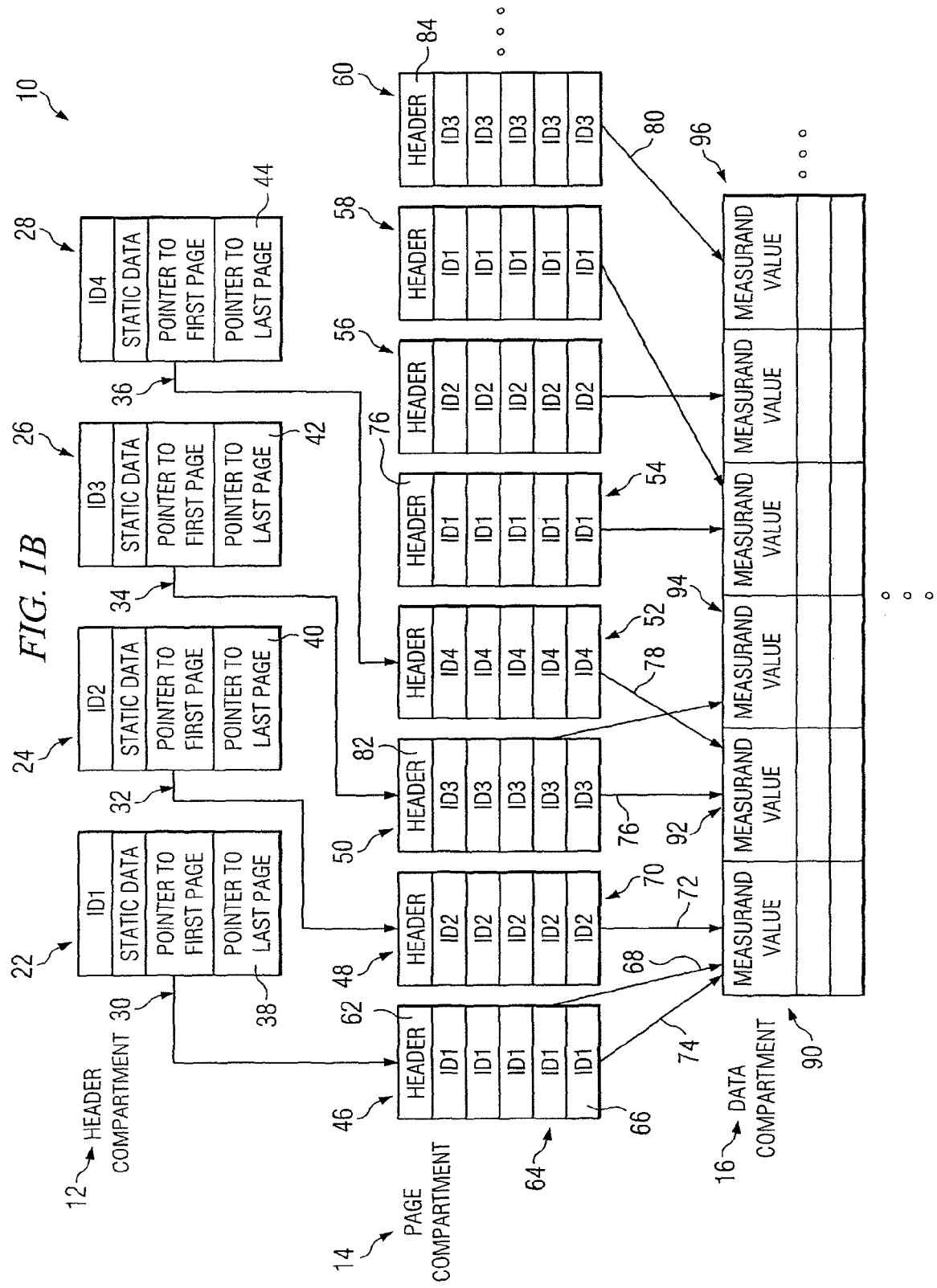
FIG. 1B illustrates one embodiment of an archival structure for telemetry or sensor data.

FIGS. 1A and 1B illustrate one embodiment of an archival structure for storing and retrieving data. In some embodiments, archival system 10 can store data at a high rate, utilize lower disk space, and provide improved retrieve performance compared to other approaches. The teachings of the disclosure recognize that analysts studying telemetry and sensor data, such as data from a satellite or spacecraft, have a need for a system that can archive large amounts of data from multiple sources in real time and a system that allows for fast retrieval of telemetry data or data from specific sensors. Certain embodiments of archival system 10 also can compress incoming data by reducing the number of redundant values stored.

Archival system 10 can be implemented on a variety of computer systems. Archival system 10 could reside on a computer system located near a variety of sensors used to gather data for the system. Alternatively, archival system 10 could reside on a remote computer system. Archival system can be fully implemented in software or with a combination of hardware and software. FIG. 1A shows an example embodiment of archival system 10 on a remote computer system 240. Archival system 10 resides in memory 220 on computer system 240. Processor 230 is operable to manage archival system 10 and other functions of computer system 240. Display 250 can be used to show sensor information to an analyst using the system. Satellite 270 transmits sensor data, and the sensor data is received by satellite dish 260. Satellite dish 260 transmits the data to computer 240 for processing by archival system 10.

As described in greater detail below, archival system 10 includes three separate logical compartments: a header compartment 12, a page compartment 14, and a data compartment 16. Each compartment stores different attributes of an update from a sensor, called a measurand update. Each sensor has a unique measurand identifier (measurand ID), which can be used to distinguish the sensors from one another. As the sensors receive updated measurements, the measurand update and a time associated with the update can be sent to archival system 10 for processing. In system 10, header compartment 12 contains static information for each measurand ID; page compartment 14 contains linked pages for each measurand ID; and data compartment 16 contains the actual data associated with a measurand update.

Header compartment 12 contains static information for each measurand ID. FIG. 1B shows four different header compartments 12 for four different measurand IDs, having reference numerals 22, 24, 26, and 28. Certain embodiments of archival system 10 may contain fewer header compartments, and certain embodiments may contain more. One header compartment is used for each sensor collecting data for the system, so the size of the system is based at least in part on the number of sensors for which the system is collecting data. The four header compartments 22, 24, 26, and 28 are each associated with a unique measurand ID, represented here by ID1, ID2, ID3, and ID4. ID1, for example, may be a temperature measurement from a temperature sensor aboard a spacecraft. The header compartment 22 associated with ID1 contains static data corresponding to this temperature sensor. For example, the header compartment may contain a name or identifying number for the sensor, data sizes, or measurement units for the data. The one or more header compartments 12 store static information about each measurand ID. Storing this information in the header reduces the storage space required for the system, because redundant information does not have to be stored in lower layers.

Each header compartment 12 also includes a pointer into page compartment 14, identifying the location of the first page associated with the measurand ID stored in that header compartment 12. A page is an amount of memory allocated to store data. Space is allocated in archival system 10 as a minimum amount of memory called a page. A page is allocated for each measurand ID, to store updates related to each ID. Once a page fills up with the measurand updates from the sensors, another page is allocated for that measurand ID. Header compartment 22 stores a pointer 30 to the first page 46 in page compartment 14 associated with ID1. Similarly, header compartment 24, associated with ID2, contains a pointer 32 to the first page 48 in page compartment 14 associated with ID2. Pointers 34 and 36, associated with measurand IDs ID3 and ID4, respectively, also point to the first page in page compartment 14 for those measurand IDs (pages 50 and 52 in FIG. 1B).

Header compartments 12 also include pointers into page compartment 14 to the last page for each measurand ID. For example, header compartment 22 contains pointer 38 that points to the last page in page compartment 14 for ID1. The last page for ID1 in page compartment 14 is not shown in FIG. 1B. None of the last pages for each of the measurand IDs in page compartment 14 are shown. Pointers 40, 42, and 44 are the pointers to the last pages associated with measurand IDs ID2, ID3, and ID4, respectively.

Page compartment 14 includes the linked measurand pages associated with the measurand IDs for each sensor. Each time archive system 10 receives a measurand update, the timestamp of the update is stored in page compartment 14. Also stored in page compartment 14 is a pointer, such as pointer 68, to an associated entry in data compartment 16, which contains the measurand update.

In FIG. 1B, page compartment 14 shows, as an example embodiment, eight pages labeled 46, 48, 50, 52, 54, 56, 58, and 60. Each page in page compartment 14 is linked to one of the four example measurand IDs. For example, pages 46, 54, and 58 in page compartment 14 are associated with ID1. Pages 48 and 56 are linked to ID2. Pages 50 and 60 are linked to ID3, and page 52 is linked to ID4. Each page in page compartment 14 also contains a header, like page header 62 in page 46. The page headers contain links to the next and previous pages for that measurand ID. Page header 62 in page 46, for example, would contain a link to the next page associated with ID1, which in this case is page 54. The header in page 54, page header 76, contains a link to the next page for ID1, page 58, and a link to the previous page for ID1, page 46. The page headers in page compartment 14 also contain the time range of records stored within that page. These links and time ranges stored in the page headers will aid in the retrieval of data from archival system 10.

Archival system 10 also includes data compartment 16. Data compartment 16 comprises the actual data associated with a measurand update. For example, archival system may receive temperature updates from temperature sensor ID1. The data values from the sensor will be stored in data compartment 16. Pointers from page compartment 14 will link a timestamp associated with a measurand update to the value of the measurand data stored in data compartment 12. In FIG. 1B, pointers 68, 72, and 74 are example pointers from page compartment 14 to data compartment 16.

As an example operation of archival system 10, ID3 may include a voltage sensor operable to take voltage measurements in an electronic circuit located in a spacecraft. Sensor ID3 may take 100 voltage measurements per second, and those measurand updates are relayed to archival system 10 for storage and analysis. Header 26 in header compartment 12 stores static data relating to ID3, such as the sensor name and units of measurement. Header 26 also comprises pointer 34 to page 50, the first page associated with ID3 in page compartment 14. Header 26 further comprises pointer 42 to the last page in page compartment 14 associated with ID3. The last page associated with ID3 is not shown in FIG. 1B.

As voltage updates are received from sensor ID3, the timestamps for each update are stored in the associated pages in page compartment 14. Page 50 in page compartment 14 is allocated to store timestamps for the voltage updates. Updates are written to page 50 until page 50 is full. At that time, a second page is allocated for storing updates from ID3; in this example, the second page is represented by page 60. Updated timestamps are stored in page 60 until page 60 is full, at which point a third page will be created for storing ID3 timestamps. This process of creating pages continues until no more pages are necessary for storing updates, such as when archival system 10 decides to no longer store ID3 updates, or when the computer systems aboard the spacecraft decide to temporarily suspend the updates from voltage sensor ID3.

Page 50 comprises header 82, which stores information relating to the updates from sensor ID3. Header 82 contains a link to the next page containing ID3 timestamps, page 60. Header 82 also comprises the time range of records stored in page 50. Page 60 comprises header 84, which contains links to the next page associated with ID3 (not shown), and the previous page for ID3 (page 50). The entries in page 50 and page 60 for ID3 comprise the timestamps for each update from voltage sensor ID3, and a pointer to the data compartment entry that contains the data value from the voltage sensor. For example, one of the entries in page 50 contains a pointer 76 to the appropriate measurand value 92 stored in data compartment 16. Similarly, in page 60 one of the ID3 entries is shown with pointer 80 to measurand value 96. Although not shown in FIG. 1B, each populated ID entry in each page in page compartment 14 will contain a pointer to a data compartment entry 16.

As archival system 10 receives updates from sensor ID3, the values of the updates are stored in data compartment 16. As described in further detail below, each individual measurand value received from a measurand ID is stored only once in data compartment 16. If a measurand value is received by archival system 10 that is already stored in data compartment 16, the value is not stored again. Instead, the pointer from page compartment 14 points to the value already saved in data compartment 16. This prevents duplicate data from being stored in data compartment 16, thereby saving storage space.

Figure 2:
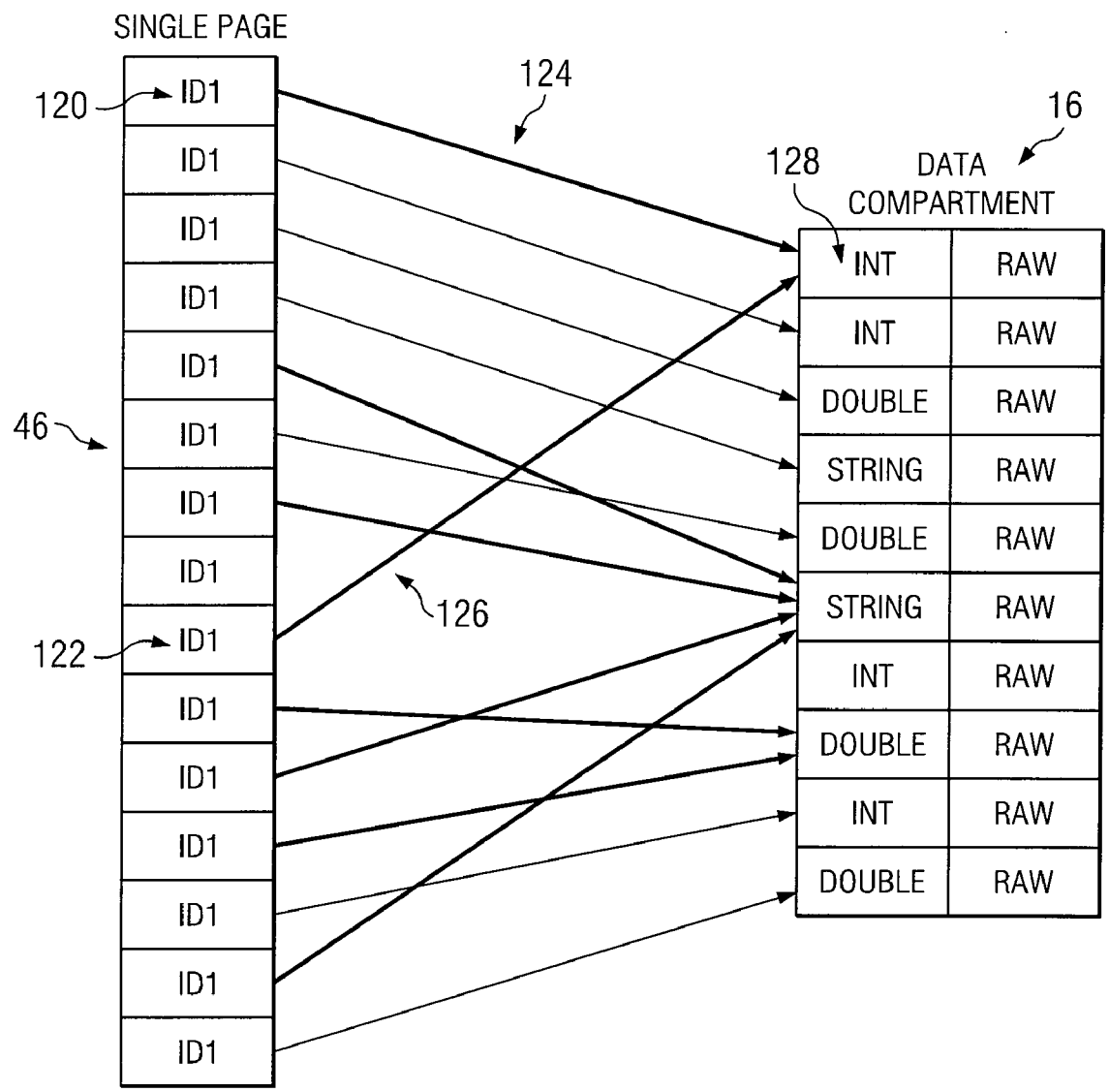
FIG. 2 illustrates one embodiment of a value compression system for telemetry or sensor data.

FIG. 2 illustrates an example embodiment of a value compression system for telemetry or sensor data. The layered index and pointer approach outlined in archival system 10 provides the opportunity to introduce a compression system for storing measurand data. If measurand values from the sensors entering the archival system 10 are stable, many of the measurand values may be redundant. For example, if ID1 is a sensor recording temperature measurements in a spacecraft, the temperature measurements may only fluctuate within a small range of temperatures. If measurements are taken every one-tenth of a second, the temperature may not change much, if at all, from one measurement to the next. If the value of the measurement already exists in data compartment 16, the system does not store the value again, but instead creates a pointer in page compartment 14 to point to the previously stored measurand value in data compartment 16.

Updates are received into archival system 10 for measurand ID1. When an update is received from a sensor, unique record attributes, like the timestamp, are stored in page 46 in page compartment 14. The raw data value is placed in data compartment 16. If two values in data compartment 16 are the same, only one value is archived and both pointers in page compartment 14 point to the same value. This is demonstrated in FIG. 2. Fifteen updates have arrived for measurand ID1 and are stored in page 46. However, only ten of the updates are unique, so there are only ten entries stored in data compartment 16. For example, measurand updates 120 and 122 are identical. Page 46 stores pointers 124 and 126 to point to measurand value 128 in data compartment 16, which is the value for measurand updates 120 and 122.

To implement a compression scheme such as this, archival system 10 maintains a mapping of previously stored updates in memory, along with their associated locations in data compartment 16. For each unique measurand ID, a hash table or hash map can be used to store a last N unique value updates for that measurand ID. When a new entry arrives, an algorithm can check for the existence of that value in the hash map before writing it to data compartment 16. If the value is already present, the pointer stored in page compartment 14 can point to the previously stored value.

Each measurand ID has its own hash map to implement a compression scheme such as this one. In most instances, the size of each map will be limited to remembering only N previous entries, to prevent unbounded memory growth. Once the hash map reaches this limit, older entries can be removed to create space for newer entries as newer entries are received.

Figure 3:
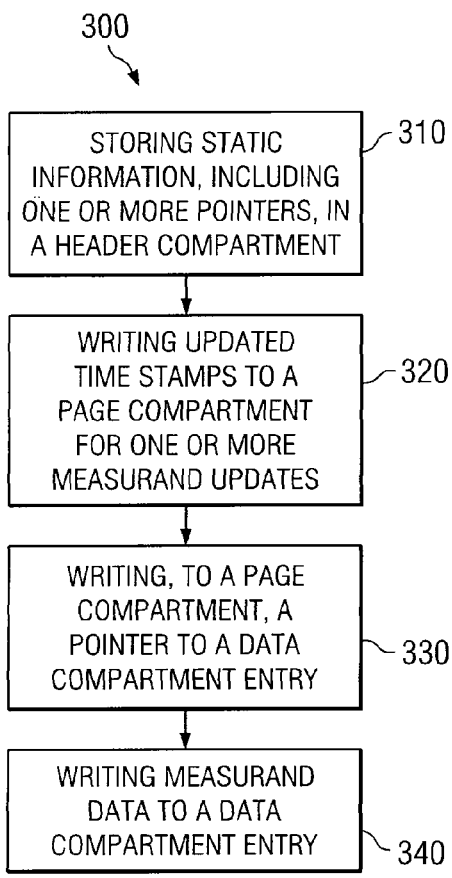
FIG. 3 is a flowchart illustrating one method of archiving data.

FIG. 3 is a flowchart illustrating an example method of archiving data in archival system 10. In step 310, static information, including one or more pointers, is stored in a header compartment, like header compartment 12. Header compartment 12 can contain static data relating to a measurand update, like a name for the sensor, data sizes, or units for the sensor measurement. Header compartment 12 can also contain one or more pointers into page compartment 14. These pointers can be used to identify the location of the first and last pages in page compartment 14 for a given measurand ID. In step 320, updated timestamps for one or more measurand updates are written to a page compartment. As the system receives updates from a sensor, the timestamp associated with each update can be written to a page in page compartment 14 associated with that measurand ID. When a page fills up with measurand ID timestamps, a new page can be allocated to store future updates from that sensor. A page header associated with a page can be used to link to the next and previous pages associated with that measurand ID. In step 330, a pointer to a data compartment entry is written to a page compartment. This pointer links to an entry in data compartment 16, where the value of the measurand data for the measurand update will be stored. If the measurand update is redundant, and the value of the measurand update has been stored previously in a data compartment entry, the pointer in page compartment 14 will point to the previously stored data compartment entry. This prevents archival system 10 from storing duplicate data in data compartment 16, thus reducing the storage space required to implement the system. Step 340 comprises writing the measurand data to a data compartment entry. If the value of the measurand update has been stored previously in a data compartment entry, the value is not stored a second time. Instead, the pointer for this measurand update stored in a page in page compartment 14 points to the previously stored value.

Figure 4:
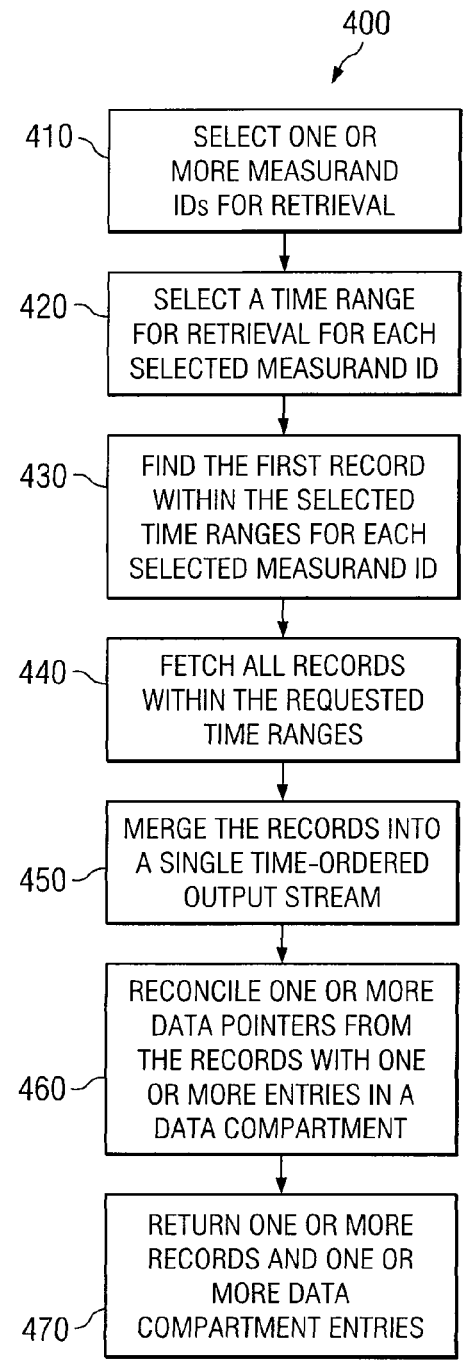
FIG. 4 is a flowchart illustrating one method of retrieving archived data.

FIG. 4 is a flowchart illustrating one method of retrieving data archived in archival system 10. In step 410, one or more measurand IDs are selected for retrieval. For example, an operator may want to retrieve one or more measurand updates from a voltage sensor ID3. The operator can select ID3 for retrieval. In step 420 a time range for retrieval for each selected measurand ID is selected. The operator may only want to see the updates from voltage sensor ID3 for a short time period, perhaps only a few seconds. The operator can select the time range for only the data of interest; selecting a smaller window will speed the retrieval process and save computing resources. In step 430 the method finds the first record within the selected time ranges for each selected measurand ID. The time ranges for the measurand updates stored in page compartment 14 are stored in the headers for each page, like header 46. System 10 can find the selected time range by reading the time ranges stored in the headers for each page associated with a selected measurand ID. Because of the way data is archived in system 10, it is not necessary to read the data stored in the page compartment entries, only the data stored in the page headers. This saves computing resources and speeds up retrieval of data. In step 440 all records within the requested time ranges are fetched. These records may be found in multiple pages in page compartment 14, or they may all be in one page. If the records are found in multiple pages, step 450 merges them into a single time-ordered output stream. Merging the records into time order provides for easier analysis and easier retrieval of data compartment entries. In certain embodiments, a selection tree can be used to perform the merge. A selection tree merge has a more efficient complexity than some other types of merges, like a K-way merge, which results in a shorter sort time and faster operation. In step 460 the data pointers from the one or more page compartment records are reconciled with the one or more entries in data compartment 16. Each entry in a page compartment record points to a data compartment entry. Multiple page compartment records may point to the same data compartment entry, if the sensor returned identical values for two different measurements. This technique reduces the number of data compartment entries that need to be returned, further saving processing time. In step 470 the one or more reconciled records and data compartment entries are returned to the operator for analysis. The entries will be in time order and sorted by measurand ID.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system for archiving data, comprising:
   a data compartment comprising one or more data compartment entries, each data compartment entry comprising a measured value from a sensor;
   a page compartment operable to store:
      a first page compartment entry, the first page compartment entry further comprising a first timestamp of a first measured value and a first pointer to the first measured value stored in a first data compartment entry; and
      a second page compartment entry, the second page compartment entry further comprising a second timestamp of a second measured value and a second pointer, wherein:
         the second pointer links the second timestamp in the second page compartment entry with the first measured value stored in the first data compartment entry if the second measured value is the same as the first measured value; and
         the second pointer links the second timestamp in the second page compartment entry with the second measured value stored in a second data compartment entry if the second measured value is not the same as the first measured value; and
   a header compartment associated with the sensor, the header compartment comprising one or more pieces of static information.

2. The system of claim 1, wherein the header compartment further comprises one or more pointers into the page compartment.

3. The system of claim 1, wherein the page compartment further comprises data stored as a series of separate pages based on a unique identifier of the sensor.

4. The system of claim 3, wherein the header compartment further comprises a pair of pointers to a first page and a last page associated with the sensor.

5. The system of claim 3, wherein the page compartment further comprises a page containing a header with links to a next page and a previous page for the sensor.

6. The system of claim 3, wherein the page compartment further comprises a page containing a header with a time range of records stored within that page.

7. The system of claim 1, wherein the measured value from the sensor comprises telemetry data.

8. The system of claim 1, wherein the static information comprises a unique identifier of the sensor.

9. The system of claim 1, wherein the static information comprises units of measurement associated with the sensor.

10. A method for archiving data, comprising:
    receiving a measured value from a sensor;
    determining that the received measured value is the same as a previously-stored measured value in a data compartment, and in response:
       writing a timestamp associated with the received measured value to a page compartment entry of a page compartment;
       writing, to the page compartment entry, a pointer to the previously-stored measured value, the pointer linking the timestamp in the page compartment entry with the previously-stored measured value; and
       preventing duplicate data in the data compartment by preventing writing the received measured value to the data compartment; and
    storing static information in a header compartment associated with the sensor, the header compartment comprising one or more pointers into the page compartment.

11. The method of claim 10, further comprising:
    creating a unique hash map for the sensor.

12. The method of claim 11, further comprising:
    if the received measured value from the sensor is not already in the hash map, writing the measured value to a hash map; and
    if the received measured value from the sensor is already stored in the hash map, retrieving a position in the hash map of the stored measured value and storing the position in the page compartment.

13. The method of claim 12, further comprising:
    if the hash map is full, deleting an oldest stored measured value associated with the sensor; and
    writing the received measured value to the hash map.

14. A method for retrieving data, comprising:
    selecting a sensor from a plurality of sensors from which to retrieve measured values;
    selecting a time range for the selected sensor;
    finding a first record in a page compartment within the selected time range for the selected sensor, the page compartment operable to store:
       a first page compartment entry, the first page compartment entry further comprising a first timestamp of a first measured value and a first pointer to the first measured value stored in a first data compartment entry of a data compartment; and
       a second page compartment entry, the second page compartment entry further comprising a second timestamp of a second measured value and a second pointer, wherein:
          the second pointer links the second timestamp in the second page compartment entry with the first measured value stored in the first data compartment entry if the second measured value is the same as the first measured value; and
          the second pointer links the second timestamp in the second page compartment entry with the second measured value stored in a second data compartment entry if the second measured value is not the same as the first measured value; and
    fetching all records within the selected time range from the page compartment; and
    merging the fetched records into a single time-ordered output stream.

15. The method of claim 14, wherein merging the records into a single time-ordered output stream further comprises using a selection tree to perform the merge.

16. The method of claim 14, wherein the method further comprises determining, using the pointers from the records, one or more entries in the data compartment.

17. The method of claim 16, wherein the method further comprises returning the determined one or more data compartment entries.

18. The method of claim 16, wherein the method further comprises returning the fetched records from the page compartment and the determined one or more data compartment entries.

* * * * *